(12) United States Patent
Radulescu et al.

(10) Patent No.: US 6,196,288 B1
(45) Date of Patent: Mar. 6, 2001

(54) SIPING GEOMETRY TO DELAY THE ONSET OF RIB EDGE WEAR IN TRUCK TIRES

(75) Inventors: Robert C. Radulescu, Simpsonville; David Alan Weston, Taylors, both of SC (US); James Edward Stone, Charlotte, NC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 08/990,423

(22) Filed: Dec. 15, 1997

(51) Int. Cl.$^7$ .............................. B60C 11/04; B60C 11/12; B60C 105/00
(52) U.S. Cl. .................... 152/209.17; 152/209.18; 152/209.22; 152/209.23; 152/901; 152/DIG. 3
(58) Field of Search ................ 152/209 R, 209 D, 152/DIG. 3, 209.2, 209.17, 209.18, 209.21, 209.22, 209.23, 900, 901

(56) References Cited

U.S. PATENT DOCUMENTS

| | | | |
|---|---|---|---|
| 2,261,025 | * | 10/1941 | Havens . |
| 2,272,879 | * | 2/1942 | Hargraves . |
| 2,612,928 | * | 10/1952 | Buddenhagen ................. 152/DIG. 3 |
| 3,550,665 | * | 12/1970 | Verdier . |
| 3,954,130 | | 5/1976 | Verdier ............................. 152/209 R |
| 4,078,596 | * | 3/1978 | Nakayama et al. . |
| 4,214,618 | | 7/1980 | Takigawa et al. ................ 152/209 D |
| 4,282,914 | * | 8/1981 | Takigawa et al. . |
| 4,449,560 | | 5/1984 | Tansei et al. ..................... 152/209 R |
| 4,723,584 | | 2/1988 | Yamaguchi et al. ............. 152/209 R |
| 4,836,257 | * | 6/1989 | Mamada et al. . |
| 4,840,210 | | 6/1989 | Kukimoto ......................... 152/209 A |
| 4,878,526 | | 11/1989 | Ochiai .............................. 152/209 R |
| 5,099,899 | | 3/1992 | Takeuchi .......................... 152/209 R |
| 5,109,901 | * | 5/1992 | Miyamoto et al. . |
| 5,109,904 | * | 5/1992 | Numata et al. . |
| 5,203,933 | * | 4/1993 | Nagahisa ......................... 152/DIG. 3 |
| 5,289,862 | | 3/1994 | Schuster ........................... 152/209 R |
| 5,386,861 | * | 2/1995 | Overhoff et al. . |
| 5,896,905 | * | 4/1999 | Lurois ............................. 152/DIG. 3 |

FOREIGN PATENT DOCUMENTS

| | | | |
|---|---|---|---|
| 1313116 | | 1/1993 | (CA) ............................. B60C/11/12 |
| 384182 | * | 8/1990 | (EP) . |
| 2086748 | | 12/1971 | (FR) ............................. B60C/11/00 |
| 63-137003 | * | 6/1988 | (JP) . |
| 5-338411 | * | 12/1993 | (JP) . |
| 5-338418 | * | 12/1993 | (JP) . |

\* cited by examiner

*Primary Examiner*—Steven D. Maki
(74) *Attorney, Agent, or Firm*—Martin Farrell; Robert R. Reed

(57) ABSTRACT

The present invention provides a truck tire with a siping geometry to protect the main ribs of the tire's tread by delaying the onset of irregular wear and the growth thereof. The improved tire tread comprises a plurality of main ribs formed by grooves extending generally circumferentially around an outer surface of the tire forming a tread width for contacting the supporting surface. A plurality of sipes, positioned on both lateral edges of each one of the main ribs, provide protection for the main ribs to delay the onset of irregular wear. A pitch length and a sipe length are both selected to be within a certain range of values, as well as a ratio of the sipe length to the pitch length is selected. The sipes are preferably narrow in width having a maximum width dimension of about 0.40 millimeter. The sipes may be inset from the lateral edges of the ribs, may be curvilinear sipes, may have an inclination angle with respect to a normal to the ribs and may be at an acute angle from the circumferential direction of the tire tread.

9 Claims, 6 Drawing Sheets

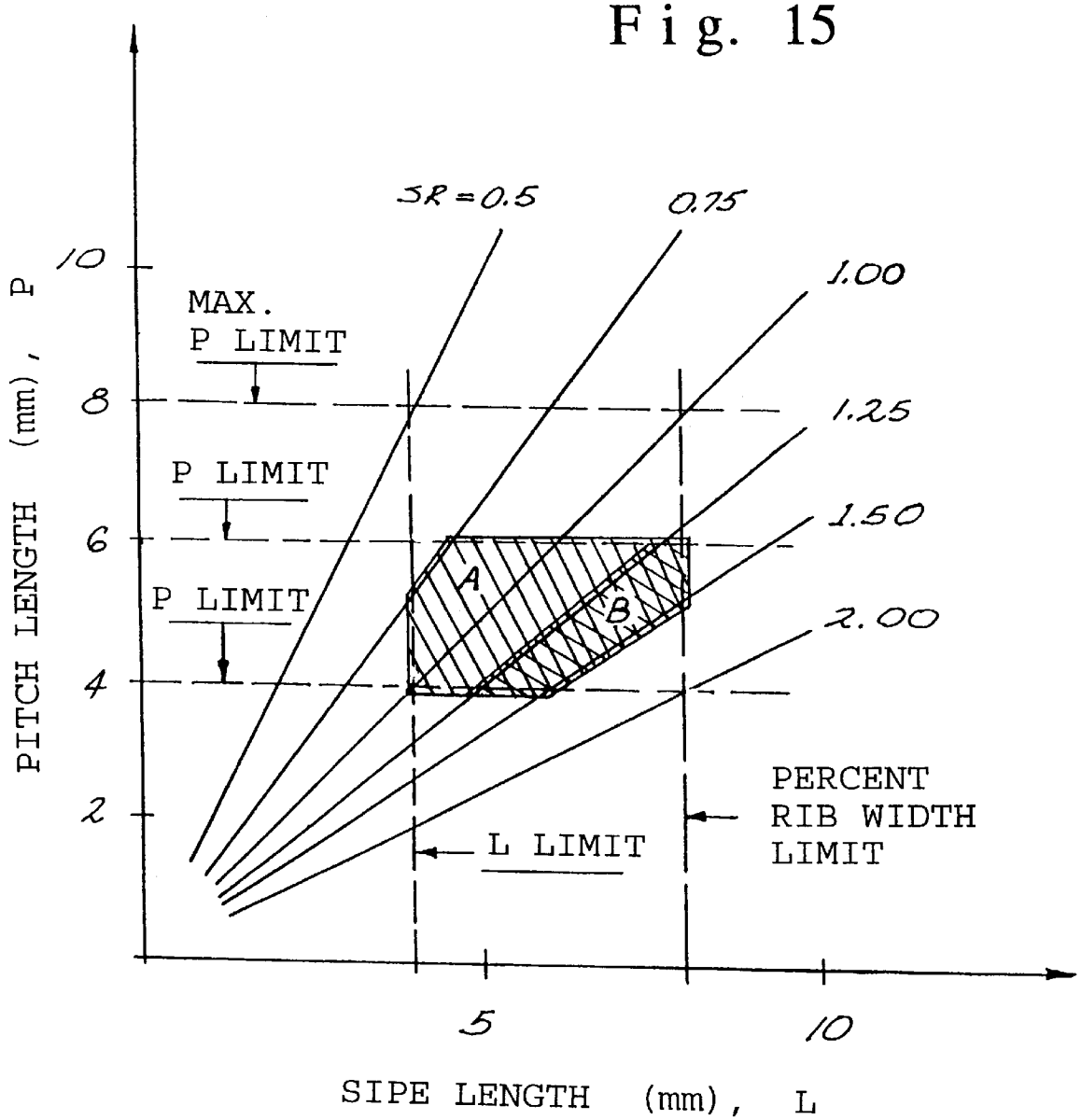

SIPING GEOMETRY TO DELAY THE ONSET OF RIB EDGE WEAR IN TRUCK TIRES

BACKGROUND OF THE INVENTION

This invention relates to vehicle tires, and more particularly to heavy duty truck tires specifically designed to be used for long haul trucking operations. The invention is particularly useful in reducing irregular wear of front axle truck tires to extend their useful life.

Irregular tire wear includes namely full shoulder wear, feather wear, shoulder cupping, rib depression, flat spotting wear, erratic depression wear, rail wear and more. A complete explanation of all types of irregular tire wear can be found in a guide entitled "Radial Tire Conditions Analysis Guide: A Comprehensive Review of Tread Wear and Conditions", published by The Truck Maintenance Council (TMC).

There are many factors that can lead to premature tire wear. The conditions the truck is running in as well as the type of load the truck is carrying both have an impact on tire wear. This invention concerns namely the front axle tires used in long haul applications. In these applications, the majority of the time the tire is going to be running in a straight line, where there is very little torque, if any, applied to the front axle tires. This is opposite to regional applications, e.g. with pick up and delivery vehicles, which run with a lot of turning and twisting, a lot of starts and stops. Normal stresses become as important as the longitudinal and lateral stresses in producing irregular tire wear. Whatever amount of irregular wear started on the tire in regional operations, this irregular wear is erased because of all the scrubbing and sideways movement of the tires in the regional application; which causes a rather high rate of wear. Abnormal wear is much less of an issue in regional operations simply because the dominant wear process is global scrubbing over the contact area of the tire tread.

Truck tires that experience straight ahead driving for a large portion of their life develop wear patterns that are unique. Tire stresses from turning and maneuvering the vehicle only exist for a limited time compared with tire stresses from straight ahead highway driving. The leading cause of irregular or premature tire wear is improper inflation pressure, with alignment coming in a close second. Poor alignment of the wheels is a common cause of irregular wear as well as compliance of the truck's suspension and steering linkages. Poor alignment include improper drive axle thrust angle, elasticity in the steering system, and drive axle lateral offset. Some of these factors are under the control of the owner and can be minimized with good maintenance practices. Others are inherently present within the steering and suspension system designs for state-of-the-art trucks.

In long haul application, irregular or uneven wear remains an issue because the tires, as they are improved in endurance, are able to last for an extremely high number of miles at a very slow rate of wear. Therefore, the chance that uneven or irregular wear governs the tread life of the tire increases. Uneven wear is a complex phenomenon that is very difficult to address. There are many different factors that can cause irregular tire wear, and it is most often a combination of them, rarely just one that will start uneven wear or cause it to increase. The combination is what makes it difficult for designers to find the right causes for an uneven wear problem. Long haul steer axle truck tires commonly have a tread pattern with a series of circumferential ribs separated by circumferential grooves. Irregular wear of rib type tires frequently starts at the edges of these ribs causing depressions, flat spots and the like which progress across the rib and along the rib with increased mileage. This is commonly called railway wear. By controlling the onset of this irregular wear pattern the user can increase the useful tread life of the tire's tread.

Although many factors seem to be closely related to maintenance parameters, the prior art already knows many attempts to try to improve the intrinsic ability of the tire to sustain long haul operations without developing uneven wear. Reference can be made to U.S. Pat. No. 4,840,210 that discloses an attempt to keep under control the shape of a shoulder area of a tire's tread in an effort to limit the onset of irregular changes in the tread as the tire wears. The solution proposed in the reference requires to mount the tire on the rim on a preselected way because of the asymmetrical profile. In U.S. Pat. No. 5,099,899 the railway wear is suppressed by increasing the zig-zag angle of the main circumferential grooves as the tread wears out. Yet another means to control irregular wear at the shoulders is disclosed in U.S. Pat. No. 4,214,618. A circumferentially extending narrow zig-zag groove at the edge of the shoulder contact surfaces reduces the railway wear and growth thereof toward the center of the tread.

A need remains to reduce the stresses on the main ribs of the steer axle truck tire during straight ahead driving. Although the prior art already knows several tires that have proved to work satisfactorily in the above mentioned long haul operations, a need exists to further improve the way the contact area of long haul truck tires can best comply with the supporting surface when subjected to wearing stresses. This improvement is best accomplished by a tread pattern which is designed to delay the onset of irregular wear for the long haul truck tire.

Accordingly, an object of the present invention is to reduce the onset of irregular wear of steer axle truck tires and reduce the growth thereof during long haul operations. The onset of railway wear that is adjacent to circumferential grooves is of particular concern.

Yet another object of the present invention is to construct a truck tire with a belt package, a carcass, bead areas and sidewalls that includes a tread design that assists the circumferential ribs to enhance the reduction in irregular wear in the main tread area of a tire.

SUMMARY OF THE INVENTION

The above objectives are accomplished according to the present invention by providing a rib type tire for long haul use with siping at the lateral edges of each rib to protect the circumferential ribs of the tire's tread by delaying the onset of irregular wear and the growth thereof.

In an embodiment of the present invention an improved tire tread for a heavy duty tire is provided. The tire tread has a carcass extending between spaced apart bead cores, a central crown area outside the carcass with a belt package for helping support the tire tread in contact with a supporting surface. The improvement comprises a plurality of main ribs formed by grooves extending generally circumferentially around an outer surface of the tire tread to provide a tread width for contacting the supporting surface. A plurality of sipes is positioned along both lateral edges of each one of the plurality of main ribs. The sipes are spaced apart a pitch length and extend from each one of the lateral edges adjacent a respective groove a sipe length. Each one of the plurality of main ribs has a rib width. A sum of the sipe lengths along both lateral edges of each rib has a maximum value of about 50 percent of the rib width. The sipe length and the pitch length define a plurality of sipe ratios of the sipe length to the pitch length. A respective sipe ratio is associated with a respective lateral edge of each one of the plurality of main ribs. Each one of the sipe ratios has a value greater than 0.5 and less than 2.0.

The sipes are formed to a sipe length and a pitch length of between about 4 mm to 8 mm and a sipe width of between about 0.2 mm to 0.4 mm. A total sipe length of axially aligned sipes formed on opposite lateral sides of a rib equals no more than 50% of the width of the rib.

Each sipe may be formed with its inner end expanded or curvilinear. Alternatively, each sipe may be formed along axial lines or may be curvilinear. Additionally, each sipe may be disposed at an acute angle relative to the circumferential direction of the opposed edges of the rib. Alternatively each sipe may extend into the rib at an angle of inclination of about between 5° to 15° relative to the radial plane of the tread.

A sipe may be separated from the adjacent rib edge by a bridge. In addition, a bridge may be formed in a bottom wall of a sipe.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 15 is a graph plotting the sipe length vs. the pitch length with various sipe ratio lines plotted and an area defined for selecting the optimum sipe and pitch lengths to increase the tire robustness against irregular wear.

DESCRIPTION OF A PREFERRED EMBODIMENT

Figure 1:
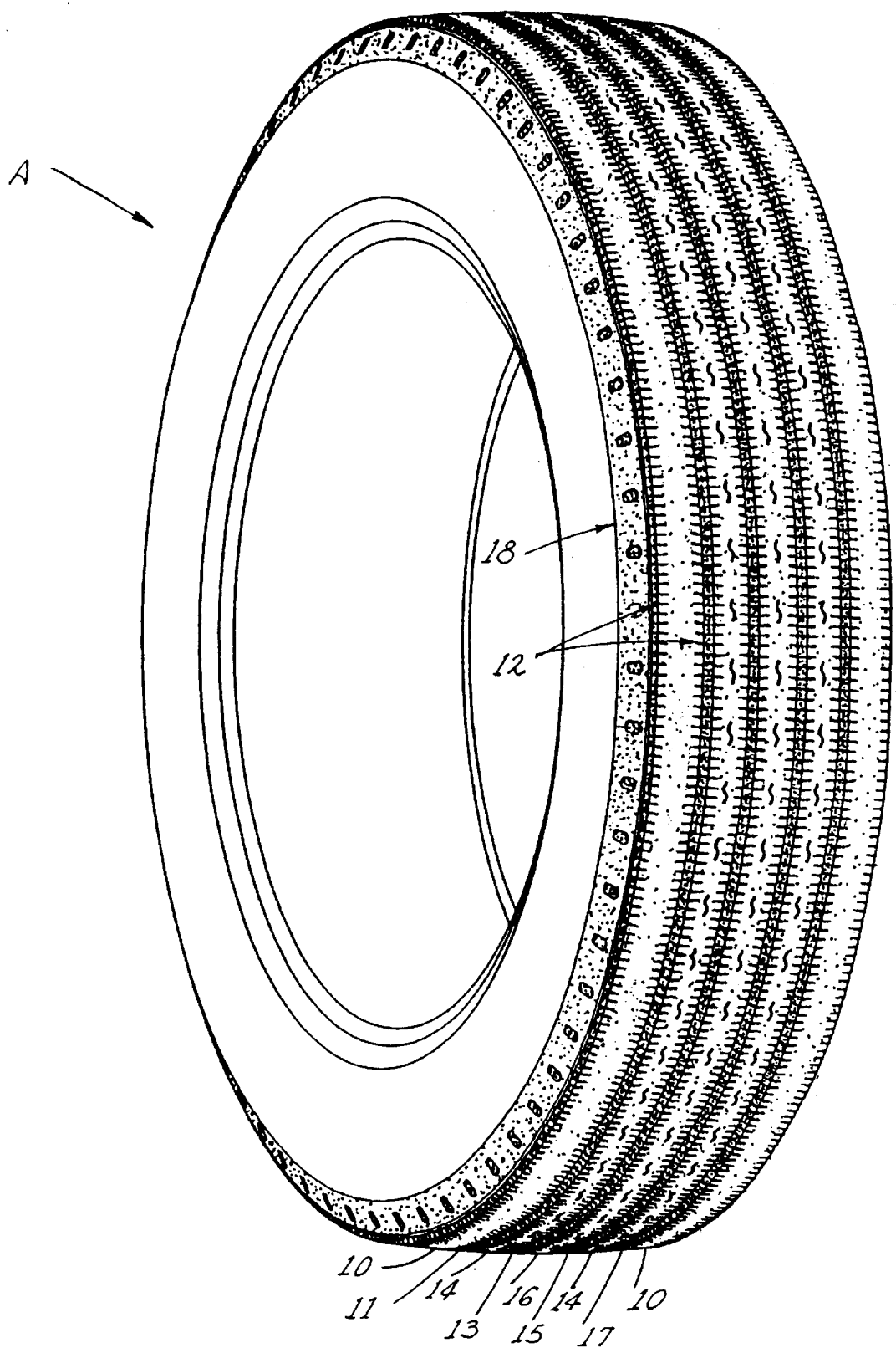
FIG. 1 is a perspective view of rib type truck tire showing a tread pattern where the lateral edges of the ribs have siping according to the present invention.

Referring now in more detail to the drawings, the invention will now be described in more detail. The reference tire A illustrated in FIG. 1 has a tread 18 with five main circumferential ribs 10, 14 and 16 defined by grooves 11, 13, 15 and 17; as well as narrow grooves 29 along both lateral edges of the tire tread. The normal running width of the tire tread is considered to be between the lateral outer edges of first interior ribs 10. Narrow lateral ribs, laterally outside of the first interior ribs, have a coupling effect with outermost ribs 10 to help maintain a flat lateral profile of the tire's tread surface. Siping 12 at the lateral edges of each rib provide an improvements in retarding irregular wear according to this invention. The nominal width of the ribs for a steer axle truck tire vary from about 20 millimeters to about 40 millimeters. The wider ribs are generally ribs 10 at the two lateral edges. That portion of the total rib width having siping is limited by the teaching of this invention. Siping geometry and configurations with design parameters which delay the onset of irregular wear while maintaining the overall endurance of the tire tread are taught.

Figure 2:
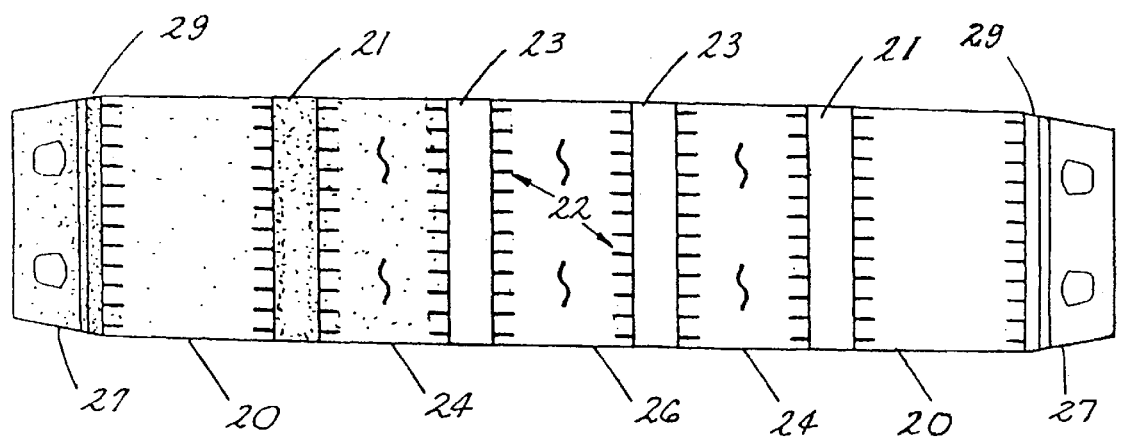
FIG. 2 is a fragmentary plan view of the tire of FIG. 1 showing details of a typical siping arrangement across the lateral width of the tire tread surface.

Preferably the present invention includes the siping at the lateral edges of each main circumferential rib, as illustrated in FIG. 2. The main ribs are formed by generally circumferential grooves 21 and 23. This embodiment combines with the structural features of the narrow shoulder ribs 27 and the narrow shoulder grooves 29 to enhance the protection of the tire against the onset of irregular wear and the growth thereof. Sipes 22 are provided for the outer edges of the each one of the plurality of main ribs 20, 24 and 26. The siping geometry or design configuration is illustrated to be the same for all ribs in FIG. 2. This is the most economical design for reducing the cost of making molds for forming the tire tread during the curing process. However, a different siping geometry can be used with each rib, or with each lateral edge of each rib, within the scope of this invention as long as the design parameters are satisfied for each series of sipes along each lateral edge. It is within the scope of this invention to vary the siping for each respective rib.

Figure 3A:
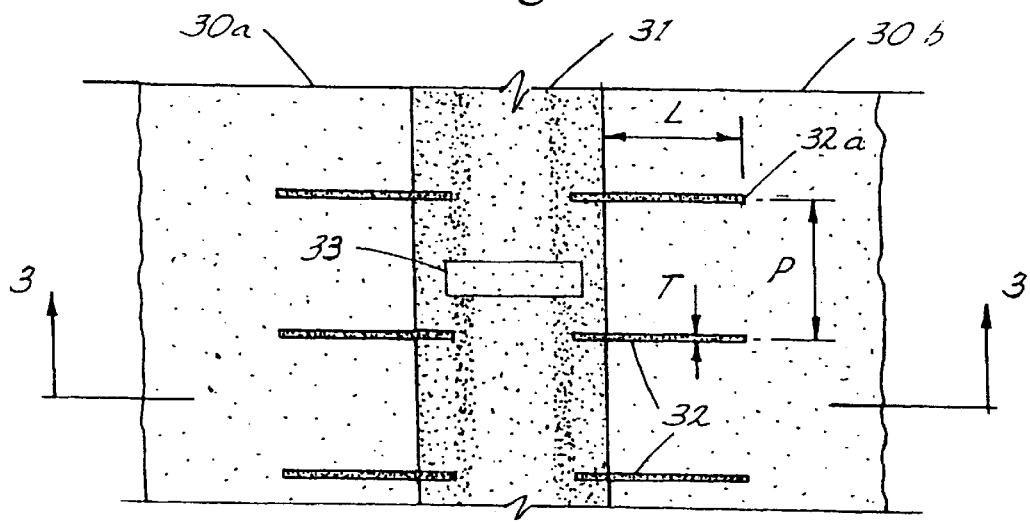
FIG. 3A is an enlarged plan view of a tire tread surface area showing the preferred siping details according to the invention as the sipes extend from a circumferential groove into a rib at the tire tread surface.

An enlarged plan view of a tire tread surface area showing the preferred siping geometry and details according to the invention is illustrated in FIG. 3A. The sipes which are located about the circumference of groove 31, extend from the groove into a rib at the tire tread surface. Preferably the sipes extend parallel with tread surface 30 from the lateral edges of ribs 30a and 30b a sipe length L into the rib and about the circumferential groove 31. The sipes 32 are spaced apart a pitch length P from one another along the circumferential length of both ribs. The width of each sipe in the circumferential direction is defined by the sipe width T. Narrow width sipes are found to be most effective in delaying the onset of irregular wear. The preferred sipe width T has been found to be in a range of about 0.20 millimeter to about 0.40 millimeter. Other siping shapes and orientations are within the scope of this invention as long as these narrow sipe width requirements are maintained. Other siping shapes are described later in this discussion.

The interior circumferential grooves 31 which may be sinusoidal are made to be similar in the preferred embodiment of this invention. Details of a typical interior grooves are illustrated by the cross-sectional view of FIG. 3B. Groove 31 is shown to comprise radial side or lateral surfaces 31a and 31b which terminate at bottom 31c form equal groove angles V1 and V2 with respect to a normal N to a respective tread surface 30a or 30b. The bottom of the grooves 31c can also be formed in a sinusoidal pattern circumferentially around the tire. Therefore, for the sinusoidal pattern, not shown the radial side faces 31a and 31b of the grooves have a varying angle with respect to the normal N. In this case the groove angles change and V1 is generally different than the groove angle V2 progressing circumferentially around the tire.

The sipe geometry is determined by the ability to define a system of design parameters which when used in combination give the desired results. FIGS. 4–8B illustrate a partial circumferential length of a typical rib of the tire tread where the onset of wear has occurred. For long haul truck tires this onset is characterized by a recessed or cupped-out area at the lateral edge of the rib. This recessed area progresses widthwise across the rib an extends in length along the rib until the useful tread life of the tire is destroyed. Further discussions of the respective sipe geometry shown in FIGS. 4–8B will illustrate a set of sipe geometric design parameters and their magnitude necessary to delay the onset of irregular tire wear.

Figure 4:
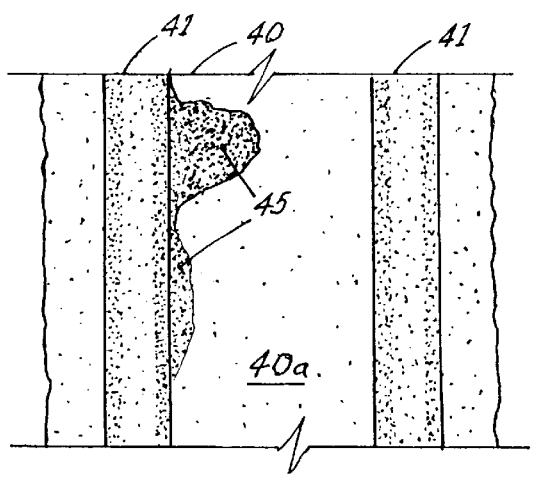
FIG. 4 is an enlarged plan view of a conventional tire tread surface area without siping and having an irregular wear pattern.

A partial plan view of a tire tread of a worn conventional heavy duty tire with no siping at the lateral edges of the ribs is illustrated in FIG. 4. An area at the edge of rib 40 adjacent the groove 41 has worn more than the surface area 40a causing a recessed area 45. The mileage when this first occurs is recorded to compare with tire treads having sipes at the lateral edges of the main ribs according to the invention.

Figure 5A:
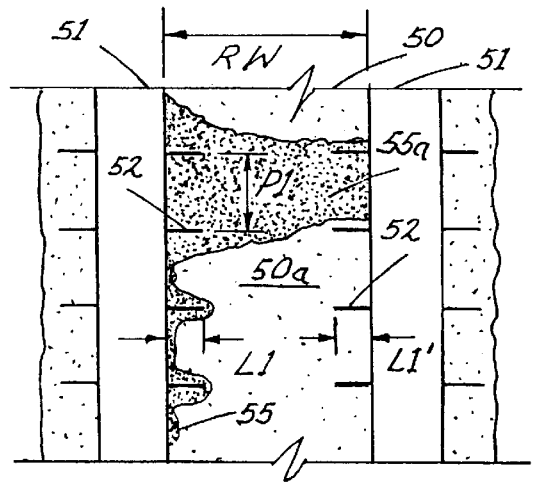
FIGS. 5A and 5B are an enlarged plan views of tire tread surface areas showing a first siping geometry ratio and associated irregular wear patterns.

A partial plan view of a tire tread of a worn conventional heavy duty tire with some siping 52 at the lateral edges of main rib 50 is illustrated in FIG. 5A. The siping is characterized by the two parameters; pitch length P1 between sipes and a sipe length L1. A sipe ratio can be obtained as a third parameter defined as a sipe ratio SR or SR1=L1/P1 for rib 50. A fourth parameter is the total widthwise sipe length SL1=L1+L1' as a percentage of the rib width RW. Preferably the sipe lengths are essentially the same at both lateral edges (L1=L1') and the sipe length L1 or L1' as a percentage of the rib width is specified. A large sipe length when compared to the rib width produces additional wear and durability problems for the tire. Therefore, the sum of the sipe lengths "L+L'" on both lateral edges of each rib is generally limited to a value of about 50 percent of a rib width "RW".

The sipe ratio SR1 of the sipe length L1 to the pitch length P1 for the tire rib 50, illustrated in FIG. 5A, has a value of SR1=0.30 This sipe ratio is a typical of what is found with conventional tire treads. For example, with a sipe length L1=3.0 millimeters and a pitch length P1=10 millimeters the sipe ratio SR1=0.30. For a sipe ratio of about 0.3 it is found that the onset of wear is characterized by recess areas 55 which has worn more than the surface area 50a. Some recessed areas have progressed across the tire to form what is typically called a rib depression 55a. The rib depression continues to increase in size with further tire use and is the cause for removing the tire from service. In general, recess areas are initiated either at the edge of main rib 50 adjacent groove 51 and between sipes 52 or they are adjacent the sipe itself, as illustrated in FIG. 3A. It is found that the onset of irregular wear for the general siping geometry of main rib 50, as illustrated in FIG. 5A, was not significantly delayed over that of the main rib 40 of FIG. 4 having no sipes. The smaller recessed areas 55 are found to progress rapidly into larger recess areas widthwise across the rib 50 and along its circumferential length and destroy the use of the tire.

Figure 5B:
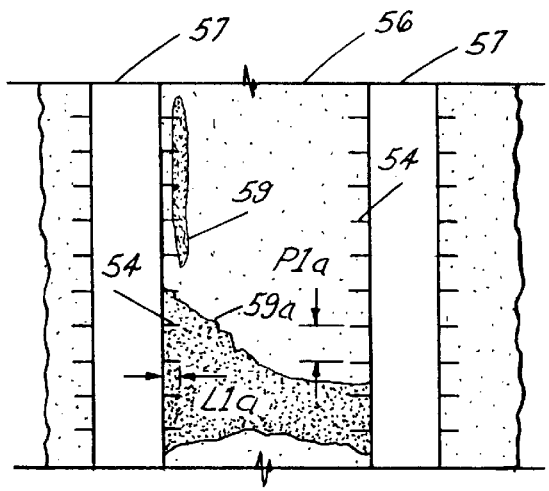

A sipe ratio SR1=L1a/P1a=0.50 is provided by sipes 54 in rib 56 of the tire tread illustrated in the partial plan view of FIG. 5B. For example, with a sipe length of 2.5 millimeters and a pitch length of 5.0 millimeters, a recess area 59 evolves with tire usage which is associated with the onset of irregular wear. The recess area is inset from the groove 57 and aligns itself with the ends of the sipes. This recess area is somewhat different in location and shape, but the results are the same. The onset of irregular wear is alightly but is not significantly delayed from that describe above and illustrated in FIG. 5A. The onset wear at the sipes eventually propagates across the rib 56 to form a rib depression 59a, as illustrated in FIG. 5B.

Figure 6:
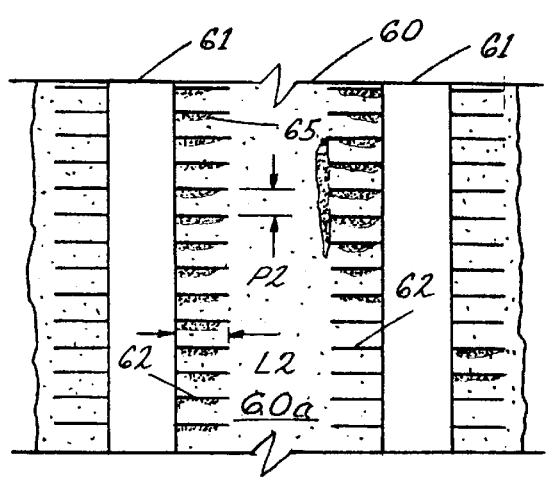
FIG. 6 is an enlarged plan view of a tire tread surface area showing a second siping geometry and an associated irregular wear pattern.

The sipe ratio SR2 of the sipe length L2 to the pitch length P2 for the tire rib 60, as illustrated in FIG. 6 for a partial plan view of a tire tread, has a value of SR2=2.00. For example, a sipe length L2=8 millimeters and a pitch length P2=4 millimeters is shown for a 30 millimeter wide rib in FIG. 6. For a sipe ratio of about 2.0, it is found that the onset of wear is characterized by small recessed areas 65 worn in the rib surface 60a at locations along one edge of a series of adjacent sipes 62, which extend generally normal to circumferential grooves 61. This general wear pattern is typical of the well known heel-toe wear of tread blocks. The small blocks are formed on three sides by the sipes 62 and grooves 61. It is found that the onset of irregular wear for the general siping geometry of main rib 60, as illustrated in FIG. 6, was slightly but was not significantly delayed over the main rib 40 of FIG. 4 having no sipes. The heel-toe wear of the recessed areas 65 are found to progress rapidly into larger recess areas widthwise across the rib 60 and lengthwise along its circumferential length and destroy the use of the tire. This is a result of the sipes being so long that the heel and toe wear along the sipes has worn halfway across the rib's width. The above test results indicate that sipe ratios of 0.50 and 2.0 constitute the outer limits for providing a delay in the onset of irregular wear and improved useful tread life of the tire through siping.

Figure 7A:
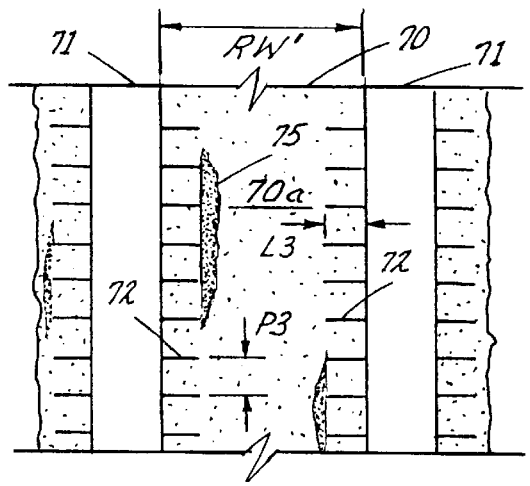
FIGS. 7A and 7B are enlarged plan views of tire tread surface areas showing a siping geometry ratio and associated irregular wear patterns according to the invention.

A siping geometry with a sipe length L3 to a pitch length P3 having a sipe ratio value of SR3=L3/P3=1.00 is illustrated in FIG. 7A for a partial plan view of a tire tread rib 70 bounded by grooves 71. For example, a sipe length L3 of 5 millimeters and a pitch length P3 of 5 millimeters were used for a 30 millimeter wide rib in FIG. 7A. For a sipe ratio of about 1.0 it is found that the onset of wear is characterized by a recessed area 75 worn in the rib surface 70a at a location along the end of a series of sipes 72 to the interior of rib 70. The general wear pattern is typical of that seen in the tire tread with no sipes (FIG. 4). The test results found that the onset of irregular wear for the general siping geometry of main rib 70 as illustrated in FIG. 7A is a significantly delayed over the main rib 40 of FIG. 4 having no sipes. In addition, the tire mileage accumulated by a tire with ribs 70 having sipes 72 is found to be significantly higher than the mileage of the same tire with any of the previous ribs 50, 56 or 60 having sipes 52, 54 or 62 respectively (FIGS. 5A–6) when the onset of irregular wear is found. The tire illustrated in FIG. 7A is found to eventually have a rib depression causing its removal from service.

Figure 7B:
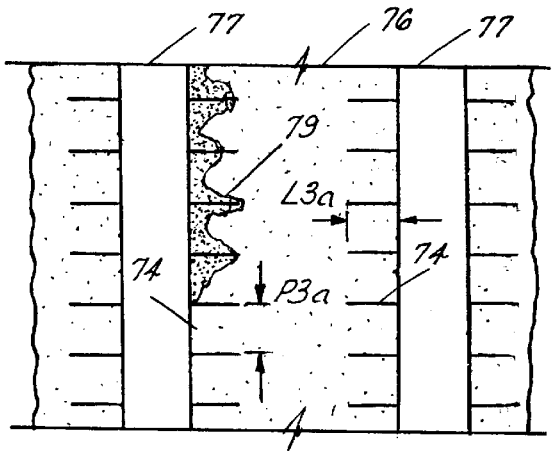

The same sipe ratio $SR3=L3a/P3a=1.00$ is provided by sipes 74 in rib 76 of the tire tread illustrated in the partial plan view of FIG. 7B. For example, with a 30 mm wide rib and a sipe length of 7.5 millimeters and a pitch length of 7.5 millimeters, a recess area 79 evolves with tire usage which is associated with the onset of irregular wear. The recess area is adjacent groove 77 and extends to the ends of the sipes. This recess area is somewhat different in location and shape from that of FIG. 7A. The delay in the onset of irregular wear is inferior to that illustrated in FIG. 7A, but is still improved over the no sipe case illustrated in FIG. 4. The tire illustrated in FIG. 7B is also found to eventually have a rib depression causing its removal from service.

Figure 8A:
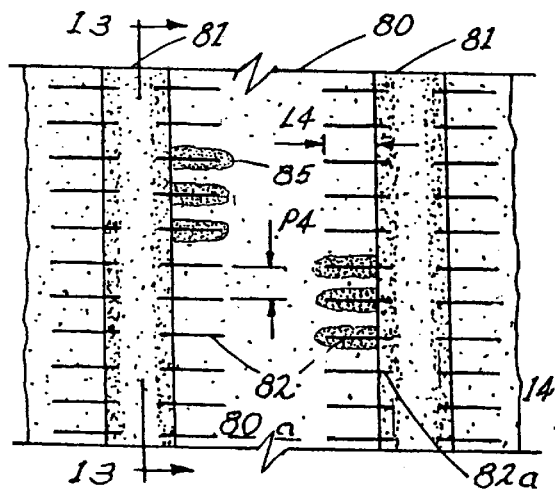
FIGS. 8A and 8B are enlarged plan views of tire tread surface areas showing another siping geometry ratio and associated irregular wear patterns according to the invention.

Another siping geometry with a sipe length L4 to a pitch length P4 having a sipe ratio value of $SR4=L4/P4=1.50$ is illustrated in FIG. 8A for a partial plan view of a tire tread rib 80 defined by grooves 81. For example, a sipe length L4 of 7.5 millimeters and a pitch length P4 of 5 millimeters were used with for a 30 millimeter wide rib in FIG. 8A. For a sipe ratio of about 1.5 it is found that the onset of wear is characterized by recessed areas 85 in the rib surface 80a along each of a series of sipes 82 being typical of a heel-toe wear pattern. The general wear pattern is typical of that seen in the tire tread with a high sipe ratio (FIG. 6). Like the previous siping geometry illustrated in FIGS. 7A and 7B, it is also found that the onset of irregular wear is also delayed. The recessed areas 85 do not grow as rapidly as the recess areas 65 where the sipe ratio is larger. Once again, the general siping geometry of main ribs 80, as illustrated in FIG. 8A, provides a significantly delayed over the main rib 40 of FIG. 4 having no sipes. The tire mileage accumulated by the tire with ribs 80 having sipes 82 is also found to be significantly higher than the mileage of the same tire with any of the previous ribs 50, 56 or 60 having sipes 52, 54 or sipes 62 respectively (FIGS. 5A, 5B and 6) when the onset of irregular wear is found. It is found that the tire with ribs as illustrated in FIG. 8A is not removed due to rib depression (as with the ribs where $SR=1.0$) but due to heel-toe wear.

Figure 8B:
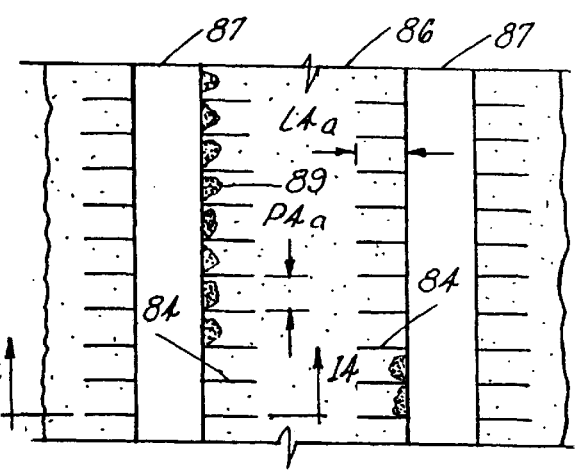

The same sipe ratio $SR4=L4a/P4a=1.50$, sipe length $L4a=7.5$ millimeters and pitch length $P4a=5.0$ millimeters is provided by sipes 84 in 30 millimeters wide rib 86 of the tire tread illustrated in the partial plan view of FIG. 8B. The recessed areas formed at the onset of irregular wear are different than those of FIG. 8A. The onset of irregular wear is characterized by small recessed areas 89 at the groove 87 edge between sipes in FIG. 8B. The difference between recessed areas illustrated in FIG. 8A in comparison to recessed areas illustrated in FIG. 8B shows two different ways recessed areas initially appear for the same siping geometry. These differences are the results of different vehicles, roadway characteristics, tire loading and the like. However, the end result is that approximately the same improved delay in the onset of irregular wear is achieved when the siping geometry is generally the same.

If the pitch length P4 was increaded to greater than 5.0 millimeters and the sipe ratio SR was maintained at a value of 1.5 the results are found to be improved over the no sipe case of FIG. 4 but worse than the case of P4=5.0 millimeters and sipe length L4=7.5 millimeters of FIGS. 8A and 8B. This is a result of the sipe length becoming a larger percentage of the rib width as L4 is increased.

The above results clearly show that the optimum sipe ratio is in a range of values of about SR=0.75 to about SR=1.5 for delaying the onset of irregular wear. These results are realized by using a siping geometry where the sipes are linear full groove depth sipes formed perpendicular to the lateral edges of the ribs. These results are also valid for added geometric features as discussed in the following sections. In fact, the above results may be enhanced for wear performance by the use of added geometric features.

From the previous discussion for the siping geometry illustrated in each case it is found that the sipe geometry which delays the onset of irregular wear can be characterized by a sipe ratio SR greater than 0.5 and up to no more than 2.0, with a preferred sipe ratio having a value between about 0.75 and about 1.5. This parameter is in addition to any one sipe lengths L+L' having a value of at most 50 percent of a respective rib width RW' (FIG. 7). Additional siping geometric parameters are also used to further define the maximum sipe length L and pitch length P for providing adjacent sipes along the lateral edges of the ribs. When the sipe and pitch lengths are too small the siping has little effect on the wear pattern of a rib and the onset of irregular wear is not changed. Making the sipe and pitch lengths too large effects the load carrying capacity and endurance of the ribs against road hazards and the like for the conventional heavy duty truck tire. The sipe length L has a value between about 4 millimeters to about 8 millimeters. Below the lower value the siping geometry is not effective in reducing the onset of irregular wear and the upper value is set when computing a sum of the two siping lengths on the two lateral sides of a rib is limited by about 50 percent of a rib width of typical steer axle heavy duty truck tires. The pitch length P is made to have a value between about 4 millimeters to about 8 millimeters, with a preferred pitch length of about 5.0 millimeters. As previously disclosed, the sipe width T of the sipes is made to have a value in a range of about 0.20 millimeter to about 0.40 millimeter.

The tread life of the tire beyond the onset of irregular wear can be enhanced by delaying the onset of irregular wear. That is, when the tire's tread progressively wears to a state that the tire must be replaced or recapped, this progression is not adversely affected by the onset delay. In fact, the progression can also be slowed by the siping geometry of this invention, especially when the added geometric features are present. Therefore, delaying the onset of irregular wear does extend the useful tread life of the tire.

The use of the siping geometry taught heretofore can be further enhanced to extend the life of a tire tread. This is particularly true with the sipe ratio SR in a range of values of about 1.25 to about 1.50. The siping geometry is enhanced by what is termed herein as "added features" that include geometric features of the sipes in addition to those previously disclosed and taught. In addition, these added features of the sipes allow the use of the higher sipe ratio ($1.25 \leq SR \leq 1.5$) to delay even more the onset of irregular wear without detrimental effects on endurance of the tire tread. For example, the heel-toe wear of using siping geometry illustrated in FIG. 8A (SR=1.5) can be made to start forming at a higher tire mileage and become more stable with the added features. Added features are discussed in more detail in the following sections.

The full effect of a correct siping geometry is realized when the endurance of the tire tread remains relatively unaffected or improved. For example, the use of a relatively small sipe width T (FIG. 3A) may increase the stresses that cause cracking at the interior ends of the sipes. Endurance factors in turn effect the rate of tire wear and the onset of irregular wear. When cracks are formed at the ends 32a of sipes 32, the stresses on the rib edges changes and wear may increase. Essentially the sipe ratio generally becomes larger and increases to a value too large as taught by the present invention. A number of additional geometric siping features have been found to improve tire tread endurance. A combination of these endurance siping parameters and the siping geometry taught heretofore can result in further delays in the onset of irregular wear. These are discussed and illustrated in the sections which follow.

A number of geometric variations in the shape and orientation of sipes (added features) are within the scope of this invention to further enhance the wear and endurance of the tire's tread. These geometric variations are illustrated in FIGS. 9–14 and discussed in the following paragraphs. The siping geometry can be selected to give the desired appearance in addition to the functional design of this invention. Some other geometric features also provide endurance improvements in addition to the onset of irregular wear, such as noise level improvements and reduced stress concentrations to increase fatigue life of the tire.

Figure 9:
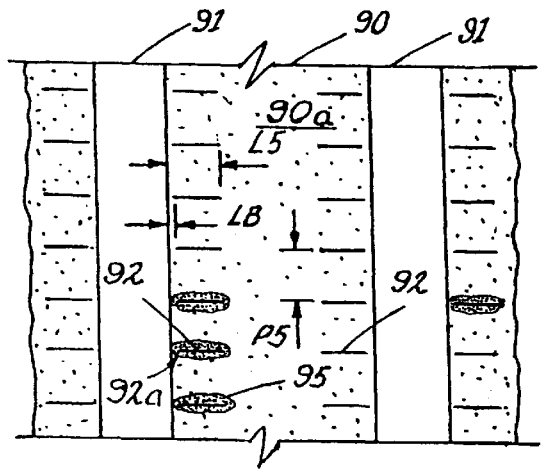
FIG. 9 is an enlarged plan view of a tire tread surface area showing a siping geometry with a bridge portion at lateral edges of the ribs and an associated irregular wear pattern according to the invention.

The siping geometry illustrated in FIG. 9 (SR=1.50) includes a bridge 92a formed between the circumferential grooves 91 and the end of the sipes 92 at the lateral edge of rib 90. The onset of irregular wear for this sipe geometry results in a recessed area 95 worn in the rib surface 90a similar to other acceptable wear onset (FIGS. 7A–8B). The bridge also keeps the sipes from gaping open which reduces cracking stresses at the other end of the sipes. However, there is a limit to the bridge length and it is found that a bridge length LB having a value of about 1.0 millimeter to about 1.5 millimeter gives a delay in the onset of irregular wear as disclosed above. The sipe length L5 is again measured from the lateral edge of the rib 90 in a direction normal to groove 91. Once again, the sipe length divided by a pitch length P5 gives a sipe ratio SR5 to be within the range of values taught by this invention (greater than 0.5 to about 2.0, and preferably about 0.75 to about 1.5).

Figure 10:
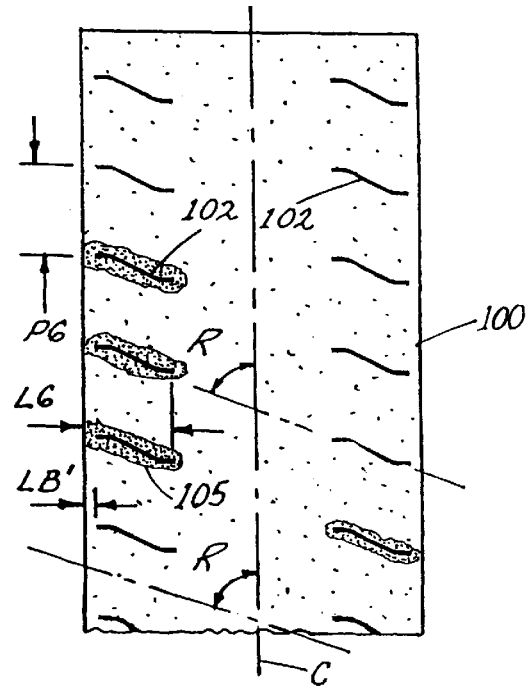
FIG. 10 is an enlarged plan view of a tire tread surface area having a curvilinear siping geometry or pattern at an acute angle with respect to the circumferential direction, a bridge portion and an associated irregular wear pattern according to the invention.

As illustrated in FIG. 10 (SR=1.50), the sipes 102 can be disposed at an acute angle R with respect to a line C parallel to the circumferential or annular direction of a tire rib 100. This acute angle helps the tire's endurance by better distributing the rib edge stresses. The siping can extend in a direction from the grooves to correspond to the forward rotation of the tire on one side of the rib and a reverse rotation on the other side of the rib, as illustrated in FIG. 10. A siping geometry to extend sipes in the same rotational direction on both lateral sides of the rib 110 is also within the scope of the present invention. The acute angle R has a value in the range of about 55 degrees to 90 degrees. While sipes 102 are shown curvilinear lines sipes are also within the scope of this invention. The curvilinear sipes 102 illustrated in FIG. 10 have a combination of curves an straight line segments. Other shapes are equally effective as curvilinear siping. The sipe length L6 is again measured from the lateral edge of the rib 100 in a direction normal to a groove. A bridge distance LB' can also be used with curvilinear siping, as shown with the sipe geometry illustrated in FIG. 10. The onset of irregular wear is once again delayed by the sipe geometry causing recessed areas 105 at the sipes, as illustrated in FIG. 10. These geometric combinations improve both the onset of irregular wear and the endurance of the tire's tread.

Figure 11:
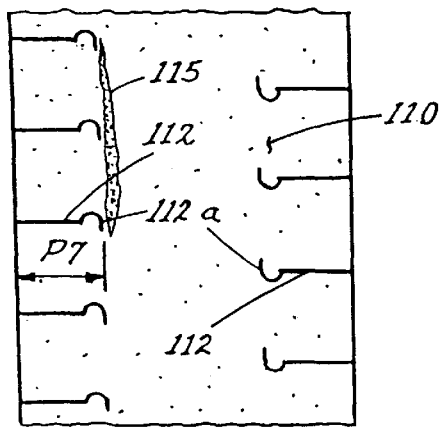
FIG. 11 is an enlarged plan view of a tire tread surface showing another alternate termination of the sipes according to a further embodiment of the invention, wherein a curvilinear ending of the sipes within a rib is provided.

The siping geometry illustrated in FIG. 11 shows a sipe geometry according to the parameters of the invention comprising a curvilinear inner ending 112a for a straight linear sipe 112. The sipe length L7 is again measured in a direction normal to the lateral edge of the rib 110. The reduced stress concentrations at ends 112a of the sipes 112 help reduce the onset of irregular wear. Once again the wear is delayed by the sipe geometry and the stress reducing feature causing an inset recessed area 115 to be delayed in forming during running of the tire.

Figure 12:
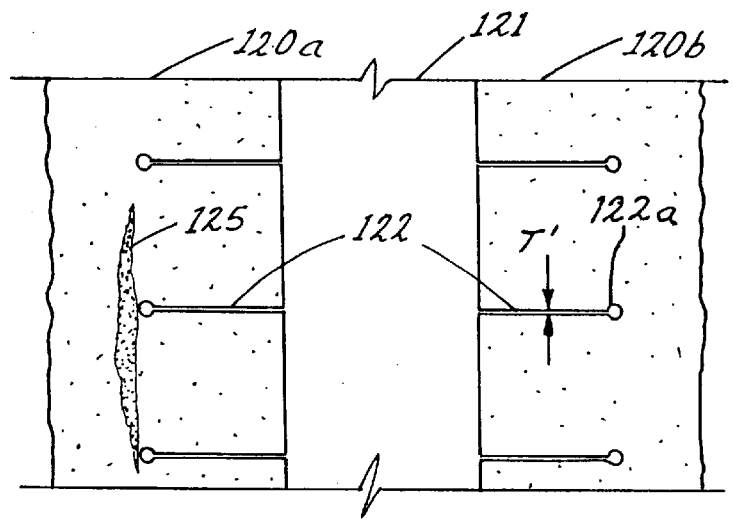
FIG. 12 is an enlarged plan view of a tire tread surface area showing an alternate termination of the sipes according to another embodiment of the invention, wherein an enlarged end is provided for each of the sipes within a rib.

In an effort to further reduce the amount of heel-toe wear experienced with some siping geometries at the onset of irregular wear (i.e., FIG. 8A and SR=1.50), the sipe width is found to be a parametric factor that can be utilized. Improvements in the onset of irregular wear and endurance are realized by reducing the sipe width to a relatively small value so that the two adjacent surfaces of the sipes can support one another in a area where the tire tread is in contact with a supporting surface. The sipes of this invention have very narrow sipe widths in a range of about 0.20 millimeter to about 0.40 millimeter (FIG. 3A). The preferred sipe width is about 0.2 millimeters. The result of using such a small sipe width is illustrated in FIG. 12. In addition, the internal end of the sipes 122 within the ribs 120a and 120b have been expanded when forming said sipes of a narrow sipe width T' to provide enlarged internal ends 122a for reducing stress concentrations at ends 122a. Endurance is improved and heel-toe wear is delayed.

Figure 13:
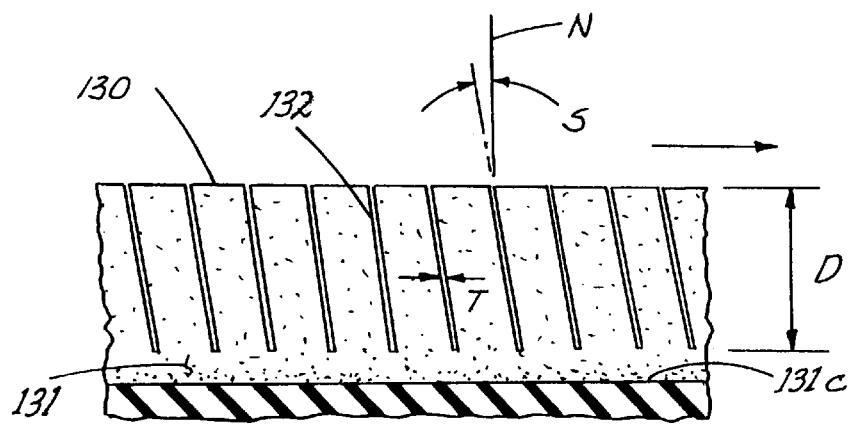
FIG. 13 is a cross-sectional view of the sipes taken along line 13—13 in FIG. 8A, wherein sipes have an inclination angle with respect to a normal to the tread surface according to yet another embodiment of the invention.

Referring to the illustration of FIG. 13, sipes 132 are formed with an inclination angle S with respect to a normal N to the tread surface 130. This view is taken from a circumferential groove looking laterally at a rib, as shown by line 3—3 in FIG. 8A. The inclination angle S, when an inclination is provided, has a value in the range of about 5 degrees to about 15 degrees, extending into the tread in a direction to correspond to road direction or the forward rotation of the tire, as indicated by the arrow. An angle between 5 and 15 degrees is found to increase the robustness of ribs with respect to irregular wear. Further optimization of the inclination angle is not within the scope of this invention, but is the subject of other investigations and patent applications by the Applicant.

Figure 3B:
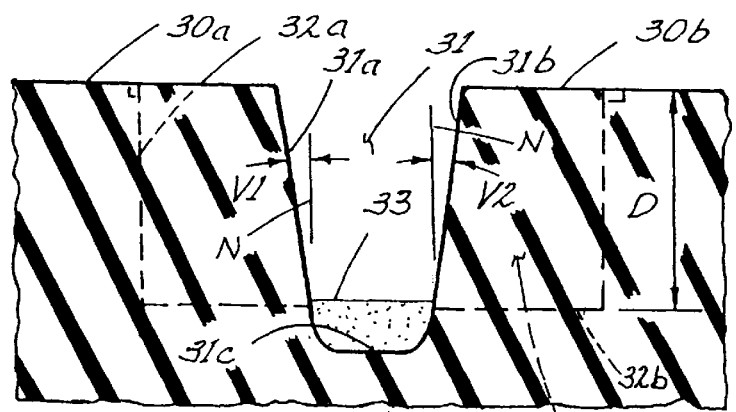
FIG. 3B is a cross-sectional view taken along the line 3—3 in FIG. 3A.

The distance the sipes extend into the tread perpendicular to the tread surface or wear surface 30a or 30b is shown by the sipe depth D illustrated in FIGS. 3B and 13. In FIG. 3B, the sipes are shown to have a sipe depth which is less than the depth the groove bottom 31c and which extends below the wearing surfaces 30a and 30b of the tire tread. In FIG. 13, the sipes 132 also stop at a sipe depth less than the depth of the groove bottom 131c below the surface 130. The sipe depth requirement for the sipe geometry of this invention are quite simple. That is, the sipes must extend to a sipe depth where they remain below the wear surface during the life of the tire's tread to be effective. The sipe depth is made to a preferred depth which is greater than the depth to the top of the wear bar 33 (FIG. 3B). At this depth the sipes are useful in increasing the tire's endurance and delaying the onset of irregular wear until the tire must be replaced or recapped.

Figure 14:
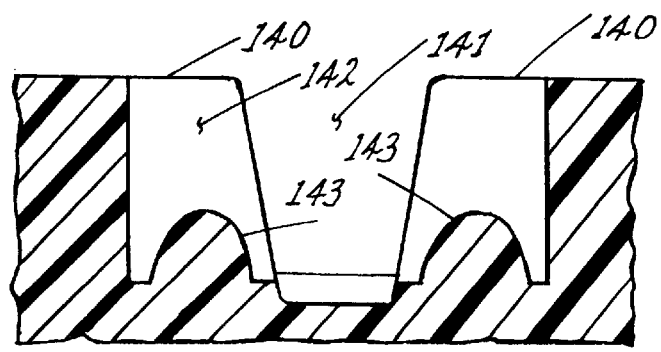
FIG. 14 is a cross-sectional view of the sipes taken along line 14—14 in FIG. 8B, wherein sipes have an internal bridge portion within the sipe, wherein sipes are not a full depth along the lateral length of the sipes.

Bridging can also be provided within a sipe having an optimum siping geometry (i.e., SR=1.50) to further reduce the cracking endurance of the tire tread, as well as reduce heel-toe wear. For example, a bridge can be provided along the bottom of each sipes, as illustrated in FIG. 14. This view is looking at a cut section laterally across the tire tread to include a sipe on both sides of a groove 141. Bridges 143 are provided at the interior bottom of each sipe 142 of each rib 140. Such a bridge will reduce the stress concentrations at the bottom of the sipes and allow the tire tread to wear uniformly.

To summarize the sipe ratio values illustrated and discussed, the information in Table I shows wear patterns and mileage results as a result of using various sipe ratios on ribs of conventional heavy duty truck tires. The wear patterns are identified by typical terminology used in the industry.

TABLE I

| RATIO (R) | TYPE OF ONSET WEAR | WEAR AT REMOVAL | RELATIVE MILEAGE AT REMOVAL |
|---|---|---|---|
| NO SIPES | RAIL WEAR | RIB DEPRESSION | REFERENCE |
| 0.50 | RAIL WEAR | RIB DEPRESSION | ≅ REF. |
| 1.00 | RAIL WEAR (inside sipes) | RIB DEPRESSION | > REF. |
| 1.50 | HEEL–TOE WEAR | HEEL–TOE WEAR | > REF. |
| 1.50 (add. feature) | HEEL–TOE WEAR | EVEN WEAR | >> REF. |
| 2.00 | HEEL–TOE WEAR | HEEL–TOE WEAR | ≅ REF. |
| >> 2.0 | RIB TEARING | RIB TEARING | << REF. |

The initial improvements in mileage are noted to occur with a sipe ratio of 1.00, and again with a sipe ratio of 1.50. This is observed by an increase in the mileage at removal over the reference mileage for the ribs with no siping. The sipe ratios of 0.50 and 2.0 do not show any improvement over the reference mileage. A larger improvement in mileage at removal occurs when the added features (FIGS. 9–14) are used along with a sipe ratio in a range of about 1.25 to about 1.50. This is a result of both a delay of the onset of irregular wear as well as a delay in the progression of wear after the initial onset of irregular wear along with improved endurance. When the sipe ratio is much larger than 2.0 the endurance of rib edges is destroyed and rib tearing occurs at the rib edges almost immediately when the tire is run in contact with a supporting surface.

The overall results of the siping geometry defined and taught in this invention are further illustrated by the graph of FIG. 15. This graph shows a plot of the pitch length P vs. the sipe length L with various sipe ratio (SR) lines identified from sipe ratio values of 0.5 to 2.0. A first region or area "A" is defined by diagonal lines to be within the limits placed on the sipe length, the pitch length and the sipe ratio lines where a sipe ratio can be selected for a conventional heavy duty rib type truck tire. In addition, a cross-hatched second region or area "B" is defined where the sipe ratio defining a siping geometry can be enhanced by the additional features (FIGS. 9–14) to further improve tire mileage before the tire must be removed or recapped.

While a preferred embodiment of the invention has been described using specific terms, such description is for illustrative purposes only, and it is to be understood that changes and variations may be made without departing from the spirit or scope of the following claims.

What is claimed is:

1. A tire tread for a tire having a carcass, a central crown area radially outside said carcass and a belt package, said tire tread being arrangeable radially outside of said belt package, said tire tread comprising:

a plurality of circumferentially extending ribs, each rib having opposed lateral sides and an outer surface of selected width, the outer surface joining the opposed lateral sides at opposed edges;

a plurality of generally circumferentially extending grooves having a selected depth formed between adjacent ribs;

each rib having a plurality of sipes formed therein to a sipe depth measured radially inward from the outer surface and to a sipe length greater than 4 mm and less than 8 mm measured perpendicular to the lateral sides, the sipes being circumferentially spaced along each of the opposed edges at a distance greater than 4 mm and less than 6 mm, each sipe extending into a respective rib to said sipe depth at an angle of inclination greater than about 5° and less than 15° relative to the radial direction, and each sipe forming an angle with respect to a circumferential direction of said tire tread greater than about 55 degrees and less than 90 degrees.

2. The tire tread of claim 1, wherein said sipes are curvilinear on the respective rib surface.

3. The tire tread of claim 1, wherein a bridge is formed in the tread at a bottom of each said sipe, the bridge terminating short of opposed lateral ends of each sipe, and said bridge having an upper surface located radially inward of the outer surface.

4. The tire tread set forth in claim 1, wherein each sipe has a sipe width of about 0.20 millimeters to about 0.40 millimeters.

5. The tire tread of claim 1, wherein in at least one of said ribs each sipe is inset from said opposed edges by a bridge distance of about 1.0 millimeter to about 1.5 millimeters.

6. The tire tread of claim 1, wherein an internal end of said sipes is expanded relative to a width of the sipe at the outer surface.

7. The tire tread of claim 1, wherein sipes are formed on said opposed edges in laterally aligned pairs.

8. The tire tread of claim 7, where a total sipe length of said pairs is not more than 50% of said selected width of the respective rib.

9. The tire tread of claim 1, wherein ends of said sipes remote from the opposed edges of the respective rib are non-linear with respect to a main linear portion of each sipe.

* * * * *